United States Patent
Ohtani

(10) Patent No.: US 7,995,053 B2
(45) Date of Patent: Aug. 9, 2011

(54) DRAWING DEVICE

(75) Inventor: Naoki Ohtani, Osaka (JP)

(73) Assignee: Panasonic Corporation, Osaka (JP)

( * ) Notice: Subject to any disclaimer, the term of this patent is extended or adjusted under 35 U.S.C. 154(b) by 1079 days.

(21) Appl. No.: 11/658,559

(22) PCT Filed: Aug. 2, 2005

(86) PCT No.: PCT/JP2005/014100
§ 371 (c)(1),
(2), (4) Date: Jan. 25, 2007

(87) PCT Pub. No.: WO2006/013849
PCT Pub. Date: Feb. 9, 2006

(65) Prior Publication Data
US 2009/0009518 A1    Jan. 8, 2009

(30) Foreign Application Priority Data
Aug. 4, 2004  (JP) ................. 2004-227926

(51) Int. Cl.
*G06F 17/00* (2006.01)
*G06T 1/00* (2006.01)
*G06T 15/00* (2006.01)
*G06T 11/20* (2006.01)
*G06F 12/02* (2006.01)

(52) U.S. Cl. ........ 345/418; 345/419; 345/420; 345/441; 345/544

(58) Field of Classification Search .......... 345/418–420, 345/441, 544
See application file for complete search history.

(56) References Cited

U.S. PATENT DOCUMENTS

| | | | |
|---|---|---|---|
| 5,844,576 A | 12/1998 | Wilde et al. | |
| 6,438,266 B1* | 8/2002 | Bajaj et al. | 382/243 |
| 7,372,466 B2* | 5/2008 | Inada et al. | 345/544 |
| 2005/0195197 A1* | 9/2005 | Wolfe | 345/505 |

FOREIGN PATENT DOCUMENTS

| | | |
|---|---|---|
| JP | 9-305777 | 11/1997 |
| JP | 2001-507836 | 6/2001 |
| JP | 2003-123082 | 4/2003 |
| WO | 98/29838 | 7/1998 |

* cited by examiner

*Primary Examiner* — Kee M Tung
*Assistant Examiner* — Robert Craddock
(74) *Attorney, Agent, or Firm* — Wenderoth Lind & Ponack, L.L.P.

(57) ABSTRACT

A drawing device that includes a triangle detecting unit specifying a triangle to be drawn and specifying a pixel block having a pixel of the triangle and includes a B-edge detecting unit judging whether or not the pixel block specified by the triangle detecting unit includes a pixel of a triangle that is connected to the triangle. The drawing device also includes a rasterizing unit that, when the B-edge detecting unit judges that the pixel block specified by the triangle detecting unit includes the pixel of the triangle, performs the rasterization processing on the pixel block so that pixel data is generated, includes a memory R/W unit writing the pixel data of the pixel block that is generated by the rasterizing unit into a memory, and includes a drawing engine controlling a display of an image in accordance with the pixel data written into the memory.

14 Claims, 13 Drawing Sheets

| TRIANGLE | | | |
|---|---|---|---|
| $T_0$ | $P_0$ | $P_5$ | $P_1$ |
| $T_1$ | $P_1$ | $P_5$ | $P_2$ |
| $T_2$ | $P_2$ | $P_5$ | $P_3$ |
| $T_3$ | $P_5$ | $P_6$ | $P_7$ |
| $T_4$ | $P_2$ | $P_3$ | $P_4$ |
| $T_5$ | $P_0$ | $P_6$ | $P_5$ |
| $T_6$ | $P_5$ | $P_7$ | $P_3$ |
| $T_7$ | $P_3$ | $P_7$ | $P_8$ |
| $T_8$ | $P_3$ | $P_8$ | $P_{10}$ |
| $T_9$ | $P_4$ | $P_3$ | $P_9$ |
| $T_{10}$ | $P_3$ | $P_{10}$ | $P_9$ |

DRAWING DEVICE

BACKGROUND OF THE INVENTION

1. Field of Invention

The present invention relates to a drawing device that performs drawing processing of computer graphics.

2. Description of the Related Art

In general, for drawing graphics data given in a format, such as a triangle strip format (Triangle Strip), a triangle fan format (Triangle Fan), a scheme for switching between these (referred to as a snake format (Triangle Snake) hereafter), or a triangle mesh format (Triangle Mesh), a conventional drawing device used for drawing processing of computer graphics performs processing called rasterization for each individual triangle. By this processing, the graphics data is converted to information of each pixel.

FIG. 1 is a diagram showing a data format of a triangle strip.

In this triangle strip format, there are a vertex $P_0$, a vertex $P_1$, a vertex $P_2$, a vertex $P_3$, ..., a vertex $P_{Num-1}$, a vertex $P_{NUM}$, and a vertex $P_{NUM+1}$, for example. A triangle $T_0$ is formed from three vertices, which are the vertex $P_0$, the vertex $P_1$, and the vertex $P_2$. A triangle $T_1$ is formed from three vertices, which are the vertex $P_1$, the vertex $P_2$, and the vertex $P_3$. A triangle $T_N$ is formed from three vertices, which are the vertex $P_N$, the vertex $P_{N+1}$, and the vertex $P_{N+2}$. When information of NUM triangles is to be described on the understanding that a triangle is represented by information of three vertices, information of 3*NUM vertices are required. However, as a feature of this triangle strip format, information of only NUM+2 vertices is required, allowing for a reduction in the amount of data.

FIG. 2 is a diagram showing a data format of a triangle fan.

In this triangle fan format, there are a vertex $P_0$, a vertex $P_1$, a vertex $P_2$ a vertex $P_3$, ..., a vertex $P_{NUM-1}$, a vertex $P_{NUM}$, and a vertex $P_{NUM+1}$, for example. A triangle $T_0$ is formed from three vertices, which are the vertex $P_0$, the vertex $P_1$, and the vertex $P_2$. A triangle $T_1$ is formed from three vertices, which are the vertex $P_0$, the vertex $P_2$, and the vertex $P_3$. A triangle $T_N$ is formed from three vertices, which are the vertex $P_0$, the vertex $P_{N+1}$, and the vertex $P_{N+2}$. A feature of this data format is also that the amount of data can be reduced, as is the case with the triangle strip format.

FIG. 3 is a diagram showing a data format of a snake.

In the snake data format, a triangle strip and a triangle fan are freely switchable in midstream. Here, information that shows a switching point is separately needed. The amount of data in the snake format is the same as in the triangle strip format and the triangle fan format. However, because a connection state of consecutive triangles is uniquely predetermined for each case of the triangle strip format and the triangle fan format, not so many consecutive triangles can be expected unless conditions are satisfied. On the other hand, as a feature of this snake format, it is highly possible that more consecutive triangles can be formed owing to the flexibility.

FIGS. 4A and 4B are diagrams showing a data format of a triangle mesh.

In the triangle mesh format, information of vertices making up triangles is represented by an index/pointer 501 of vertex data. Although the data in this format often does not have information showing triangles that share a common edge, such information is added as needed.

Usually, an interim result or a final result of the drawing processing of computer graphics is placed in an external memory or an internal memory. This information includes: information of a distance viewed from each pixel; color information; and a degree of transparency. When processing is performed so as to reflect the information of each rasterized pixel in the interim result (such as a pixel color value or pixel depth information) that is placed in the memory, a current value needs to be read in from the memory and the result after the processing needs to be written back to the memory. In the case where the pixel is not transparent, its depth information (a value Z) is ignored, and the processing to reflect the latest information in the interim result placed in the memory is not performed, the interim result placed in the memory may not need to be read in. In this case, only writing processing is performed, cutting the time in half because the reading-in processing is unnecessary. Nonetheless, the substantial processing details are the same. An explanation is given as follows on the precondition that the interim result is read in.

In general, in order to obtain a screenful of processing results, it is necessary to process pixels, the number of which is many times larger than the size of the screen. Moreover, in animation processing, the screen needs to be updated some dozen times per second. For this reason, the pixel data has to be read in and written back at an extremely high speed. In most cases, this speed determines a speed of the drawing device.

Data can be transferred at an extremely high speed to and from a memory of recent years that is typified by a DDR SDRAM (Double Data Rate SDRAM). However, for getting the best performance, there is a constraint that requires data to be read or written in a sizable amount to a certain extent. This size has become larger as the processing speed becomes faster and the amount of data to be dealt with is increased. For this reason, the drawing device cannot read or write only one pixel of information desired out of one screen, but has to read or write information in a certain size at a time, as a pixel block, that is predetermined with respect to each system (about 4 to 256 pixels).

In most cases, a pixel area (pixel block) to be read or written at a time is one pixel high and horizontally long unless any innovation is made. However, the drawing device for computer graphics is designed to read and write in a data unit of a rough-square pixel block at a time. Reasons for the shape of square based on: that processing is performed for each pixel through the rasterization processing performed for each triangle; and that, on an average, there are more triangles which are not horizontally long than triangles which are horizontally long. That is to say, the number of unnecessary pixels located outside triangles is less when an area close to a square in shape, rather than a horizontally long area, is processed, and the efficiency is eventually increased as well. This is generally known (see Patent Reference 1, for example).

FIG. 5 is a diagram for explaining a case where a pixel block is horizontally long.

As shown in FIG. 5, an area (pixel block) 601 which is 1 pixel high by 64 pixels wide has only about 8 effective pixels coinciding with a triangle 602.

This means that the drawing device writes the pixel data of the pixel block into the memory, ending up writing the data most of which is unnecessary.

FIG. 6 is a diagram for explaining a case where a pixel block is square in shape.

As shown in FIG. 6, an area (pixel block) 701 which is 8 pixels high by 8 pixels wide has as many as 38 effective pixels coinciding with a triangle 702 that is the same as the triangle 602 shown in FIG. 5. In this way, it is obvious that there are more effective pixels in the square-shaped pixel block as compared with the horizontally long pixel block.

The above-mentioned Patent Reference 1 discloses the invention not regarding information of individual pixels, but regarding texture data to be applied to a triangle, wherein data is arranged for each 8 by 8 pixel block. This is based on the same reasons as described above.

Patent Reference 1: Japanese Translation of PCT Application laid open as JP2001-507836

BRIEF SUMMARY OF THE INVENTION

The drawing device disclosed in the stated Patent Reference 1, uses a bandwidth of a memory bus wastefully, requiring a wider bandwidth. When a bandwidth is narrow, a malfunction may occur during the drawing processing.

To be more specific, even when the pixel block is roughly square in shape, the amount of data to be read and written is increased since the data around the edges of a triangle, only part of which is necessary though, is all processed. This decreases the effectively available bandwidth of the memory bus. In other words, in spite of the fact that the total amount of data to be read or written during a certain period of time depends on the bandwidth of the memory bus, the unnecessary pixel data is read or written all together, thereby eventually reducing the amount of effective data in this total amount.

FIG. 7 is a diagram for explaining about unnecessary data.

For example, when a triangle 710 is drawn, entire pixel data of a pixel block Bk that includes a part of an edge of the triangle 710 is written into the memory. Here, this pixel block Bk has pixel data of an area Bka that is not included in the triangle 710 and pixel data of an area Bkb that is included in the triangle 710. Thus, although only the pixel data of the area Bkb is needed out of the pixel block Bk, the pixel data of the unnecessary area Bka is also written into the memory.

FIG. 8 is a diagram for explaining how the unnecessary data is written into the memory in the case of the triangle strip format.

When drawing the triangles $T_0$, $T_1$, $T_2$, and $T_3$ sequentially, the drawing device first writes pixel data of pixel blocks having pixels included in the triangle $T_0$. Then, the drawing device writes pixel data of pixel blocks having pixels included in the triangle $T_1$.

In this case, the pixel blocks in an area 811 which includes a common edge shared by the triangle $T_0$ and the triangle $T_1$ are written into the memory twice: when the data of the triangle $T_0$ is written; and when the data of the triangle $T_1$ is written.

For example, a pixel block Bk1 of the area 811 has pixel data of an area Bk1$a$ included in the triangle $T_0$ and pixel data of an area Bk1$b$ included in the triangle $T_1$. On account of this, when the data of the triangle $T_0$ is to be written, the entire pixel data of the pixel block Bk1 including the area Bk1$b$ that is unnecessary is written into the memory. Similarly, when the data of the triangle $T_1$ is to be written, the entire pixel data of the pixel block Bk1 including the area Bk1$a$ that is unnecessary is written into the memory.

In this way, when drawing the triangles $T_0$, $T_1$, $T_2$, and $T_3$ sequentially, the drawing device writes all the blocks included in the respective areas 811, 812, and 813 into the memory twice although the unnecessary data is included in those blocks each time.

As compared to the case where the memory is used exclusively by the drawing device, it is more serious in the case where the memory is also used by a different device, that is, where the drawing device is included as a unit in a system LSI (Large Scale Integration). In such a case, a quantitative regulation or the like is often carried out so as to prevent a specific unit (or device) from dominating the memory bus and interfering with operations performed by the other units. Accordingly, an effort to reduce memory access, although it takes some time as the case may be, often allows for access to more effective data and for an improvement in performance of the drawing device.

With this being the situation, it is assumed that a cache system to process pixel data collectively is to be created in order to reduce the needless memory access. In many cases, neighboring triangles are drawn sequentially not only in the triangle strip format and the triangle fan format but also in the format with versatility such as the triangle mesh format. On account of this locality, a general cache system can considerably improve the efficiency.

However, if such a cache system is created for the drawing device of the above-stated Patent Reference 1, the effect would be small unless the cache size is significantly large. Also, a circuit configuration would be more complicated, meaning that a significant number of man-hours for development would be required to implement a cache circuit. An increase in the size of the cache leads to an increase in the circuit scale. In addition to this, the requirement for the man-hours would raise the price of an LSI or a device having this cache.

The present invention was conceived in view of the stated problem, and has an object of providing a drawing device that can make effective use of a memory bus bandwidth without needing an expensive and complicated circuit configuration.

In order to achieve the stated object, the drawing device of the present invention is a drawing device which performs rasterization processing on drawing data and a drawing operation, said drawing device comprising: a triangle specifying unit operable to specify a first triangle area, from the drawing data, that is subjected to the rasterization processing; a block specifying unit operable to specify a pixel block having a pixel included in the first triangle area; a judging unit operable to judge whether or not the pixel block specified by said block specifying unit includes a pixel of a second triangle area that is connected to the first triangle area; a rasterizing unit operable to, when the judging unit judges that the pixel block includes the pixel of the second triangle area, rasterize the pixel block so that pixel data is generated; a writing unit operable to write the pixel data of the pixel block that is generated by said rasterizing unit into a memory; and a display control unit operable to have an image displayed in accordance with the pixel data written into the memory.

With this, the pixel block including the pixels of the first and second triangle areas is detected, and then the rasterization processing is performed on the pixel block including these pixels before the block is written into the memory. Thus, as distinct from the conventional example, unnecessary data other than the pixel of the first triangle is prevented from being written into the memory. As a result, the memory bus bandwidth can be effectively used by preventing waste from being caused when the pixel data is written, without needing development and implementation of a large-sized cache memory and a complicated circuit that requires a significant number of man-hours for development. That is to say, the memory bus bandwidth can be effectively used without needing an expensive and complicated circuit configuration. The waste is primarily caused at the edges of triangles during the memory access, and the present invention can reduce this waste.

For example, consider the case where the number of triangles is large enough in the triangle strip format. In terms of individual triangles, the problem is improved for two out of three edges of a triangle. This allows for a considerable reduction in the memory bus bandwidth on the whole. As shown in FIG. 8, the triangle $T_1$ and the triangle $T_2$ respectively have two, out of three edges, that are shared, meaning that waste is not eliminated as to the remaining one edge here.

Moreover, said judging unit may be operable to judge whether or not the pixel block specified by said block specifying unit includes the pixel of the second triangle area that is to be drawn after the first triangle area is drawn.

With this, when the first triangle area is subjected to the rasterization processing, that is, when the first triangle area is subjected to be drawn, the second triangle area is treated as a triangle subjected to the first processing that is to be next drawn. When the first triangle area is subjected to be drawn, the rasterization processing is performed on the pixel block including the pixel of the triangle subjected to the first processing. Accordingly, instead of the unnecessary data, the pixel data of the triangle subjected to the first processing can be written into the memory, which allows for the effective use of the memory bus bandwidth.

Furthermore, the judging unit may be operable to judge whether or not the pixel block specified by the block specifying unit includes the pixel of the second triangle area that was drawn before the first triangle area is drawn.

With this, when the first triangle area is subjected to the rasterization processing, that is, when the first triangle area is subjected to be drawn, the second triangle area is treated as a processed triangle that has been drawn most recently. When the first triangle area is subjected to be drawn, the rasterization processing is performed on the pixel block including the pixel of the processed triangle. Accordingly, instead of the unnecessary data, the pixel data of the processed triangle can be written into the memory, which allows for the effective use of the memory bus bandwidth.

Here, the triangle specifying unit may be further operable to specify the second triangle area, from the drawing data, that is subjected to the rasterization processing, the block specifying unit may be further operable to, when the triangle specifying unit specifies the second triangle area, specify pixel blocks which have pixels included in the second triangle area, and the rasterizing unit may be further operable to, when the triangle specifying unit specifies the second triangle area, exclude the pixel block, out of the pixel blocks specified by the block specifying unit, that was judged by the judging unit to have the pixels of the first triangle area and the second triangle area, from the rasterization processing.

On the basis of this, consider a case where the second triangle area is subjected to the rasterization processing, that is, where the second triangle area is subjected to be drawn. For example, when the block specifying unit specifies a plurality of pixel blocks having pixels of the second triangle area, a pixel block out of the plurality of the pixel blocks that includes the pixel of the first triangle area is excluded from the rasterization processing. This prevents the pixel block, which is to be drawn when the first triangle area is drawn, is prevented from being rasterized and written again into the memory when the second triangle area is drawn. Accordingly, the memory bus bandwidth can be further effectively used.

It should be noted that the present invention can be realized not only as such a drawing device, but also as a method thereof, a program thereof, a storage medium that stores the program, and an integrated circuit thereof.

The drawing device of the present invention allows for a reduction in needless memory access and, therefore, can make effective use of a memory bus bandwidth without needing an expensive and complicated circuit configuration.

DETAILED DESCRIPTION OF THE INVENTION

The following is a description of an embodiment of the present invention, with reference to the drawings.

Figure 9:
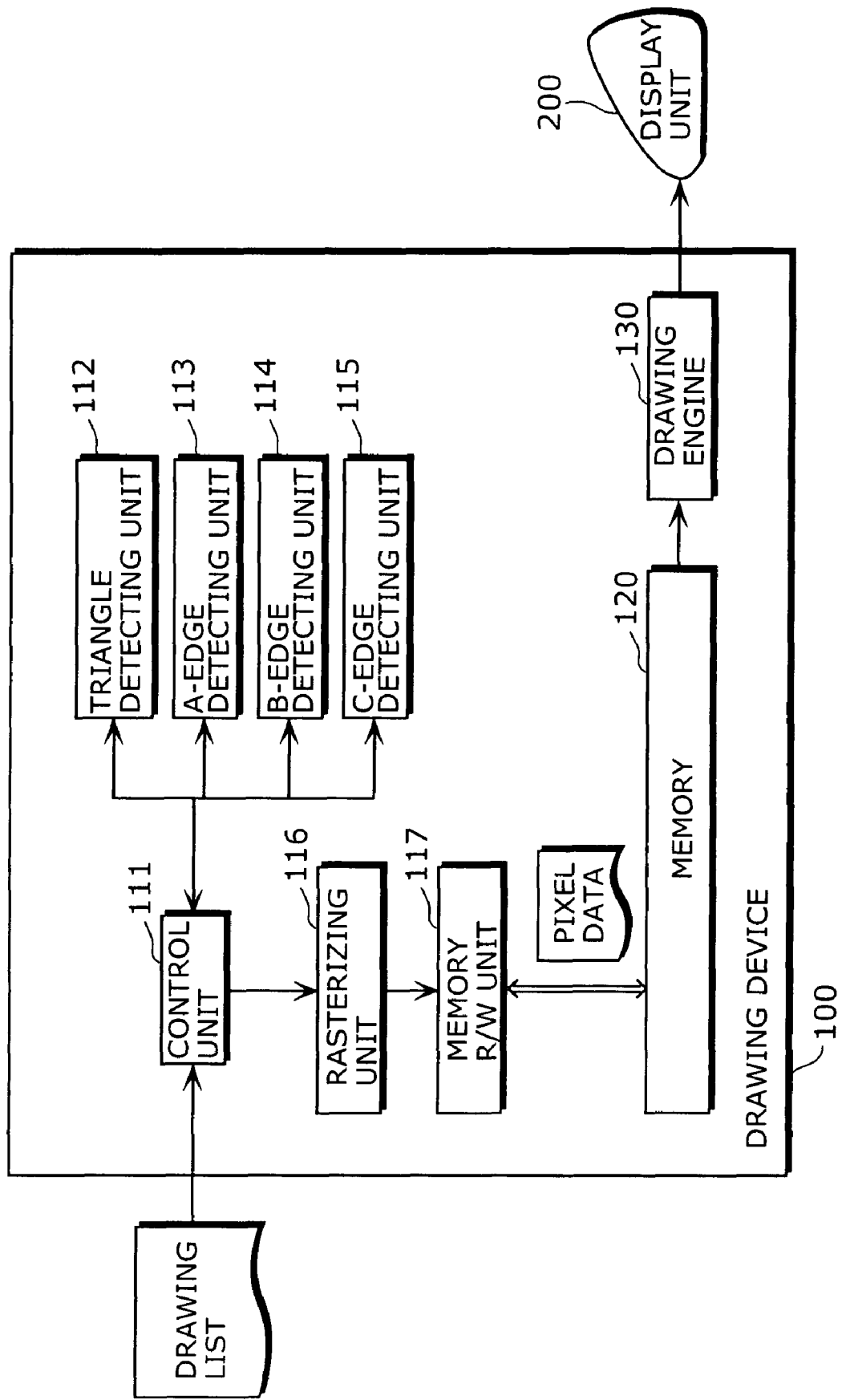
FIG. 9 is a block diagram showing a construction of a drawing device according to an embodiment of the present invention.

FIG. 9 is a block diagram showing a construction of a drawing device according to the embodiment of the present invention.

A drawing device 100 according to the present embodiment enables effective use of a memory bus bandwidth without needing an expensive and complicated circuit configuration. The drawing device 100 is composed of: a control unit 111, a triangle detecting unit 112, an A-edge detecting unit 113, a B-edge detecting unit 114, a C-edge detecting unit 115, a rasterizing unit 116, a memory R/W unit 117, a memory 120 serving as a pixel recording module, and a drawing engine 130.

The drawing device 100 described above determines processing details for each block using a pair of the triangle detecting unit 112 and one of the edge detecting units 113, 114, and 115, on the basis of information of, not three vertices, but four vertices when the rasterization processing is performed by the rasterizing unit 116. This allows for a reduction in the amount of data read and written between the memory R/W unit 117 and the memory unit 120.

The control unit 111 obtains a drawing list expressed in three dimensions, and then converts the drawing list into two-dimensional data. The drawing list includes each coordinate in three dimensions, and a color and a normal at the coordinate as well. The control unit 111 converts this drawing list into the two-dimensional drawing data that shows each coordinate in two dimensions and a color and the like at the coordinate.

Moreover, the control unit 111 transmits the two-dimensional drawing data to the triangle detecting unit 112, the A-edge detecting unit 113, the B-edge detecting unit 114, and the C-edge detecting unit 115. Then, the control unit 111 outputs a triangle subjected to be drawn and pixel blocks detected by the above-stated units and the two-dimensional drawing data to the rasterizing unit 116.

From the two-dimensional drawing data, the triangle detecting unit 112 detects the triangle that is subjected to be drawn, and also detects the pixel block having a pixel included in the triangle subjected to be drawn (this pixel block is referred to as the triangle pixel block). To be more specific, a pixel block entirely included in the triangle subjected to be drawn and a pixel block that includes a part of an edge of the triangle are detected as the triangle pixel blocks. The pixel block that includes a part of the edge of the triangle includes not only a pixel of the triangle subjected to be drawn but a pixel that is unnecessary for the triangle as well.

The A-edge detecting unit 113 detects a pixel block, out of the triangle pixel blocks, that is located on an edge of a triangle that is connected to the triangle now subjected to be drawn and that was subjected to be drawn most recently (that is, this triangle has been already processed).

To be more specific, the A-edge detecting unit 113 judges whether there is a pixel block in the triangle pixel blocks that includes a pixel of the processed triangle and, when there is, detects such a pixel block. Here, for detecting the pixel block which includes a pixel of the above-mentioned processed triangle, the A-edge detecting unit 113 performs the detection using three vertices of the triangle subjected to be drawn and one vertex of the processed triangle. Here, this one vertex of the processed triangle refers to a vertex which is not located on a common edge shared by the triangle subjected to be drawn and this processed triangle. Hereinafter, the pixel block detected in this way is referred to as the "A-pixel block".

The B-edge detecting unit 114 detects a pixel block, out of the triangle pixel blocks, that is located on an edge of a triangle that is connected to the triangle now subjected to be drawn and that will be next subjected to be drawn (that is, this triangle is subjected to the first processing).

To be more specific, the B-edge detecting unit 114 judges whether there is a pixel block in the triangle pixel blocks that includes a pixel of the triangle subjected to the first processing and, when there is, detects such a pixel block. Here, for detecting the pixel block which includes a pixel of the above-mentioned triangle subjected to the first processing, the B-edge detecting unit 114 performs the detection using three vertices of the triangle subjected to be drawn and one vertex of the triangle subjected to the first processing. Here, this one vertex of the triangle subjected to the first processing refers to a vertex which is not located on a common edge shared by the triangle subjected to be drawn and this triangle subjected to the first processing. Hereinafter, the pixel block detected in this way is referred to as the "B-pixel block".

The C-edge detecting unit 115 detects a pixel block, out of the pixel blocks including the pixels of the triangle subjected to the first processing, that is located on an edge of a triangle that is connected to the triangle subjected to the first processing and that will be subjected to be drawn after the next (that is, this triangle will be subjected to the second processing). To be more specific, the C-edge detecting unit 115 detects a pixel block, out of the pixel blocks including the pixels of the triangle subjected to the first processing, that includes a pixel of the triangle subjected to the second processing. Hereinafter, the pixel block detected in this way is referred to as the "C-pixel block".

On the basis of the two-dimensional drawing data, the triangle subjected to be drawn, the pixel block of this triangle, the A-pixel block, the B-pixel block, and the C-pixel block, the rasterizing unit 116 performs the rasterization processing on the effective part of the triangle pixel blocks so as to generate pixel data.

To be more specific, the rasterizing unit 116 excludes the A-pixel block, out of the triangle pixel blocks, from the processing. Then, within the triangle pixel blocks from which the A-pixel block has been excluded, the rasterizing unit 116 performs the rasterization processing on at least a part of each of the triangle subjected to be drawn and the triangle subjected to the first processing so as to generate the pixel data. At this time, the rasterization processing is performed on the B-pixel block included in the triangle pixel blocks, with the B-pixel block including the pixels of the triangle subjected to be drawn and the triangle subjected to the first processing.

The memory R/W unit 117 writes the pixel data generated through the rasterization processing performed by the rasterizing unit 117 into the memory 120 in the units of the triangle pixel blocks excluding the A-pixel block.

The drawing engine 130 is constructed as a display control unit, and has the display unit 200 display an image (i.e. a triangle subjected to be drawn) in accordance with the pixel data written into the memory 120.

In the present embodiment described so far, when the triangle subjected to the drawing processing is to be drawn, the rasterization processing is performed, with the pixel of the triangle subjected to the first processing being included in the B-pixel block, then the pixel data of the B-pixel block is written into the memory. Conventionally, when the drawing processing is performed for the triangle subjected to be drawn, the pixel of the triangle subjected to the first processing is not included in the B-pixel block, but instead unnecessary data is included in the B-pixel block which is then written into the memory 120 (It should be noted here that the unnecessary data is not actually written into the memory because the unnecessary part is masked. Yet, a bandwidth of the memory bus corresponding to the amount of this data is used.) Thus, according to the present embodiment, the unnecessary data is prevented from being written into the memory 120, so that the memory bus bandwidth can be effectively used.

When the drawing processing is performed for the triangle subjected to the first processing, this triangle now becomes subjected to be drawn, which means that the above-mentioned B-pixel block becomes an A-pixel block for this triangle subjected to the first processing. Therefore, in the present embodiment, when the drawing processing is performed for the triangle subjected to the first processing, the above-mentioned B-pixel block is excluded from the processing. Conventionally, when the drawing processing is performed for the triangle subjected to the first processing, the B-pixel block including the unnecessary data is written into the memory 120 in a like manner as described above. On the other hand, the present embodiment allows for further effective use of the memory bus bandwidth.

Figure 10:
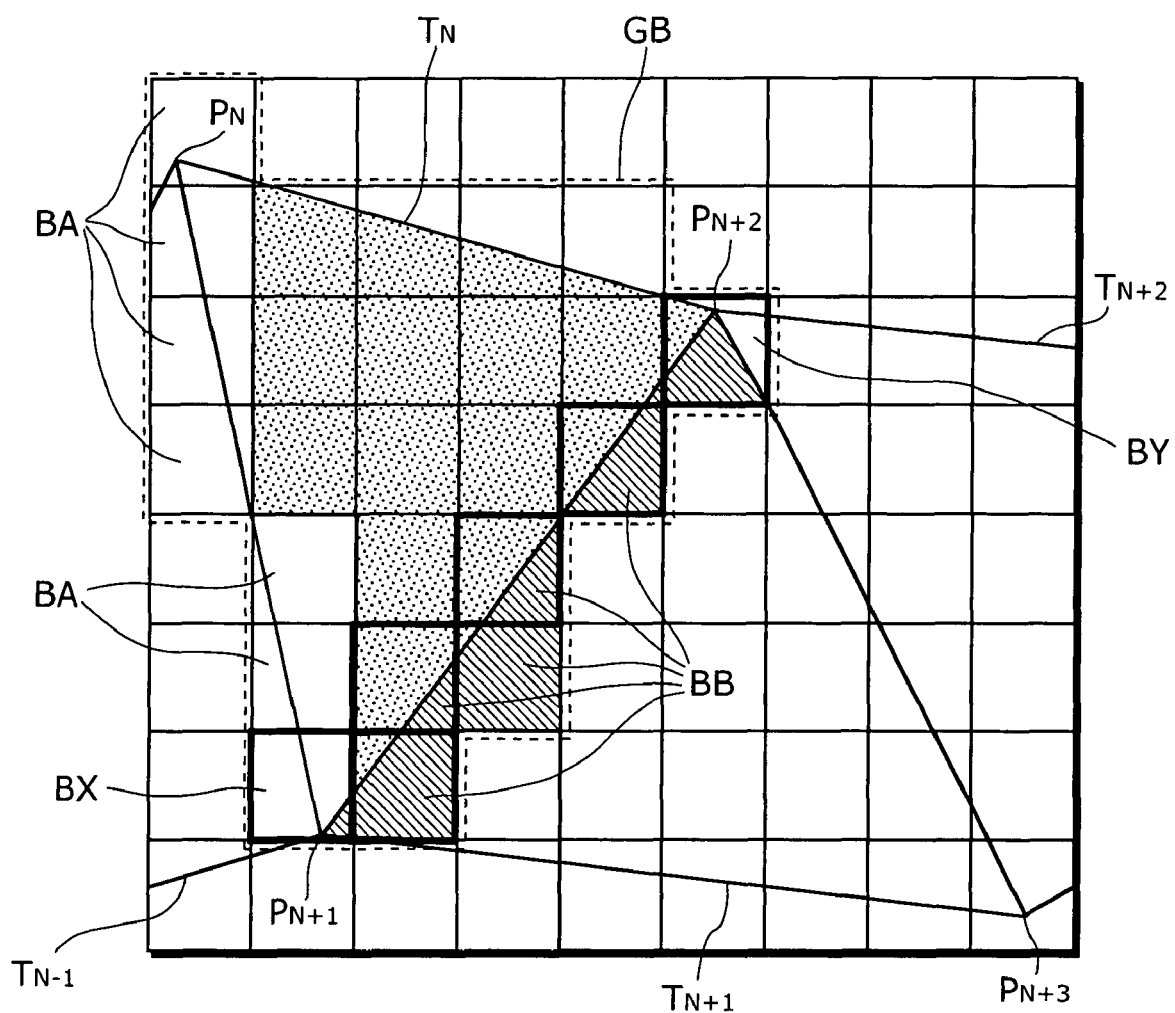
FIG. 10 is a schematic diagram showing an algorithm of the drawing device according to the embodiment of the present invention.

FIG. 10 is a schematic diagram showing an algorithm of the drawing device 100 according to the embodiment of the present invention.

In FIG. 10, a triangle $T_{N-1}$, a triangle $T_N$, a triangle $T_{N+1}$, and a triangle $T_{N+2}$ are drawn in this order. When drawing the triangle $T_N$, the drawing device 100 according to the present embodiment performs the rasterization processing on the basis of information of four vertices which include three vertices of the triangle $T_N$: an $N^{th}$ vertex $P_N$, $(N+1)^{th}$ vertex $P_{N+1}$, and $(N+2)^{th}$ vertex $P_{N+2}$; and additionally an $(N+3)^{th}$ vertex $P_{N+3}$ of the triangle $T_{N+1}$ which will be next drawn. Owing to the feature of the triangle strip format (Triangle Strip), information of two consecutive (connected) triangles can be obtained by adding information of only one vertex.

When the triangle $T_N$ shown in FIG. 10 is subjected to be drawn: the triangle $T_{N-1}$ corresponds to the above-mentioned processed triangle; the triangle $T_{N+1}$ corresponds to the triangle subjected to the first processing; and the triangle $T_{N+2}$ corresponds to the triangle subjected to the second processing. In this case, the triangle detecting unit 112 detects the triangle $T_N$ subjected to be drawn as well as detecting all the pixel blocks included in a block group GB as the above-mentioned triangle pixel blocks. The A-edge detecting unit 113 detects a pixel block BA as the above-mentioned A-pixel block. The B-edge detecting unit 114 detects a pixel block BB as the above-mentioned B-pixel block. It should be noted here that a pixel block referred to here is made up of a collection of 64 pixels, for example. Under the circumstances, when the triangle $T_N$ subjected to the drawing processing is drawn according the present embodiment, the processing is performed, with the pixels of the triangle $T_N$ subjected to be drawn and the triangle $T_{N+1}$ subjected to the first processing being included in the pixel block BB. To be more specific, the drawing device 100 performs the rasterization processing on respective parts of the triangle $T_N$ subjected to be drawn and the triangle $T_{N+1}$ subjected to the first processing within the area in the block group GB excluding the pixel block BA.

When the rasterization processing is performed on a triangle, a pixel included in the triangle has to be selected and then a parameter should be calculated for each selected pixel. Using a traditional method, each pixel is selected in the direction from the left to the right in each horizontal row which is, in turn, selected from the top to the bottom of a screen, and then a parameter is calculated for each pixel. By calculating the amount of change in the parameters of the pixels one by one at the beginning, each parameter can be obtained thereafter only by adding this amount of change. In the early days when the graphics system was developed, it was important to draw in accordance with the direction of scanning because a memory device which is large enough to record information of the entire screen cannot be prepared. Today, on the other hand, the direction of processing is not so important. It does not matter if the processing is performed from the bottom to the top of the screen, from the right to the left, or in a random manner.

In order to achieve high speed performance of the graphics system, the memory 120 needs to read and write high-volume information as fast as possible. A high-speed large-capacity memory device of recent years that is typified by a DDR SDRAM is designed to perform at a higher speed when sequentially reading or writing data at consecutive addresses. This feature should be accordingly employed for getting the best performance.

For example, in the case where a graphics system manages information of one pixel in four bytes and a memory provides better performance when reading or writing in units of 256 bytes, this means that information of 64 pixels is read or write collectively.

Figure 1:
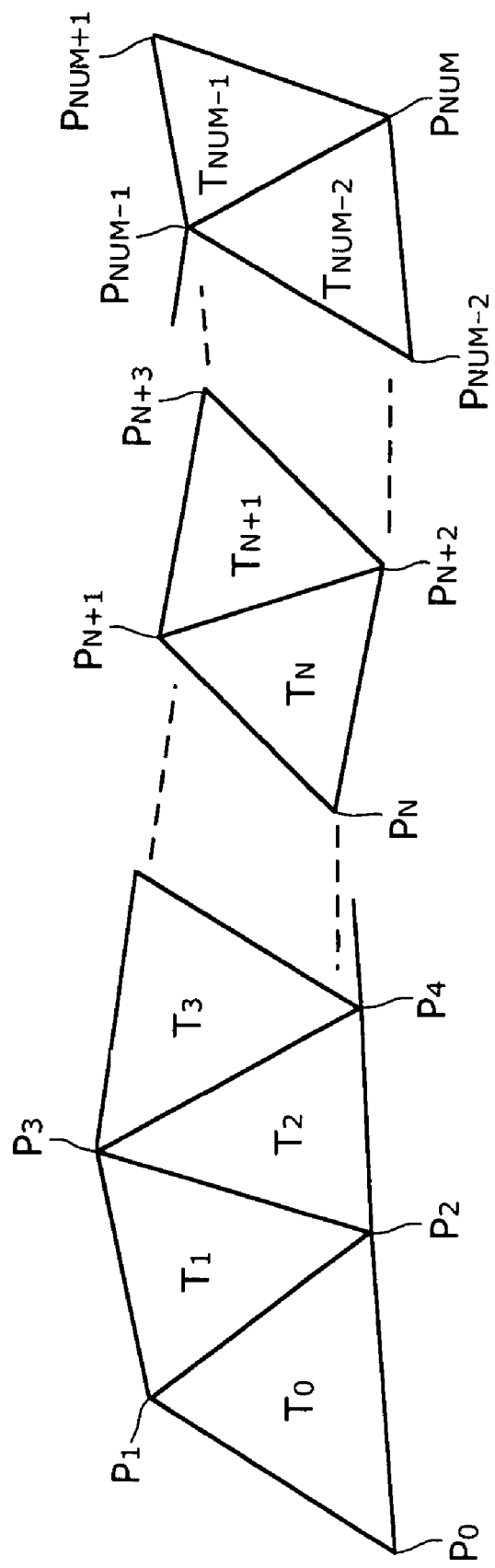
FIG. 1 is a diagram visually showing a data format of a triangle strip.
Figure 2:
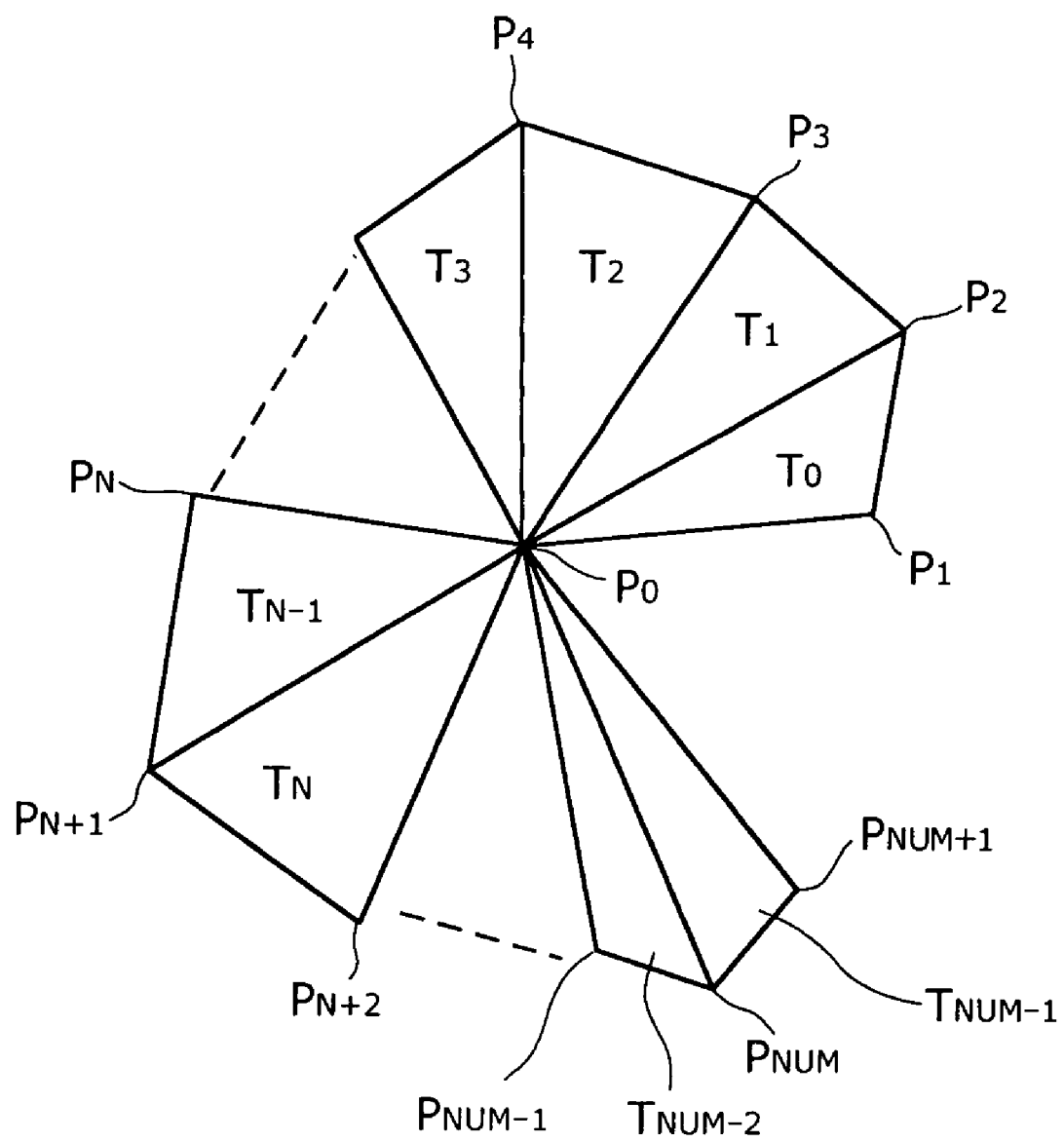
FIG. 2 is a diagram visually showing a data format of a triangle fan.
Figure 3:
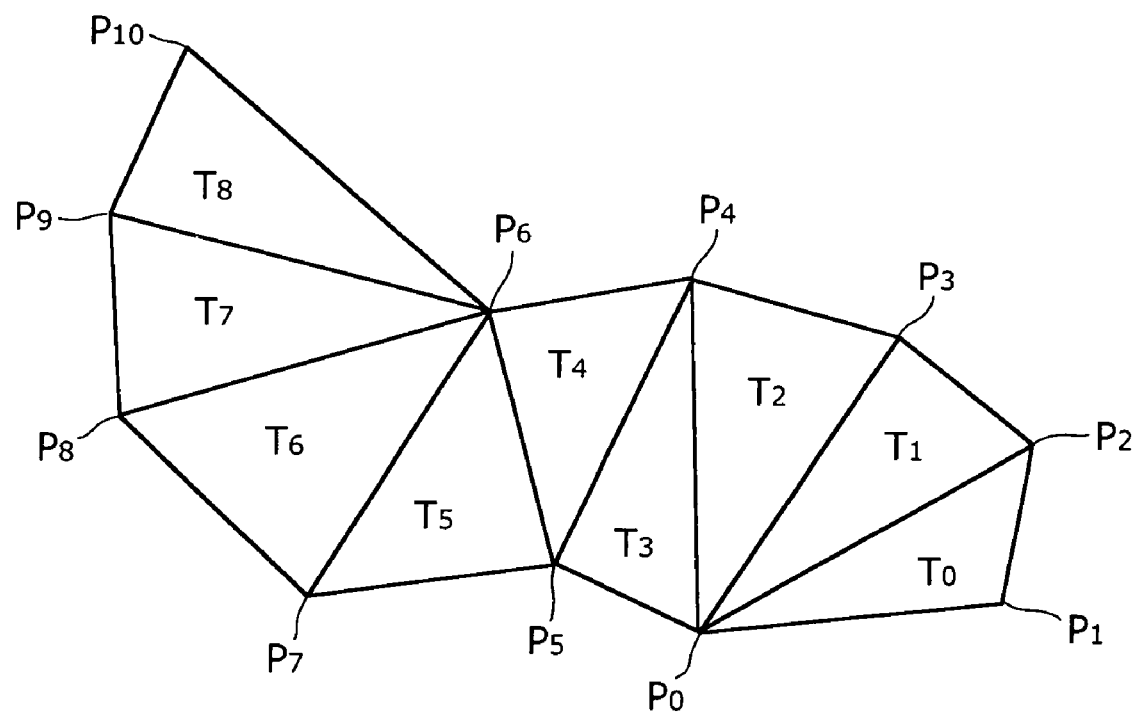
FIG. 3 is a diagram visually showing a data format of a snake.
Figures 4A, 4B:
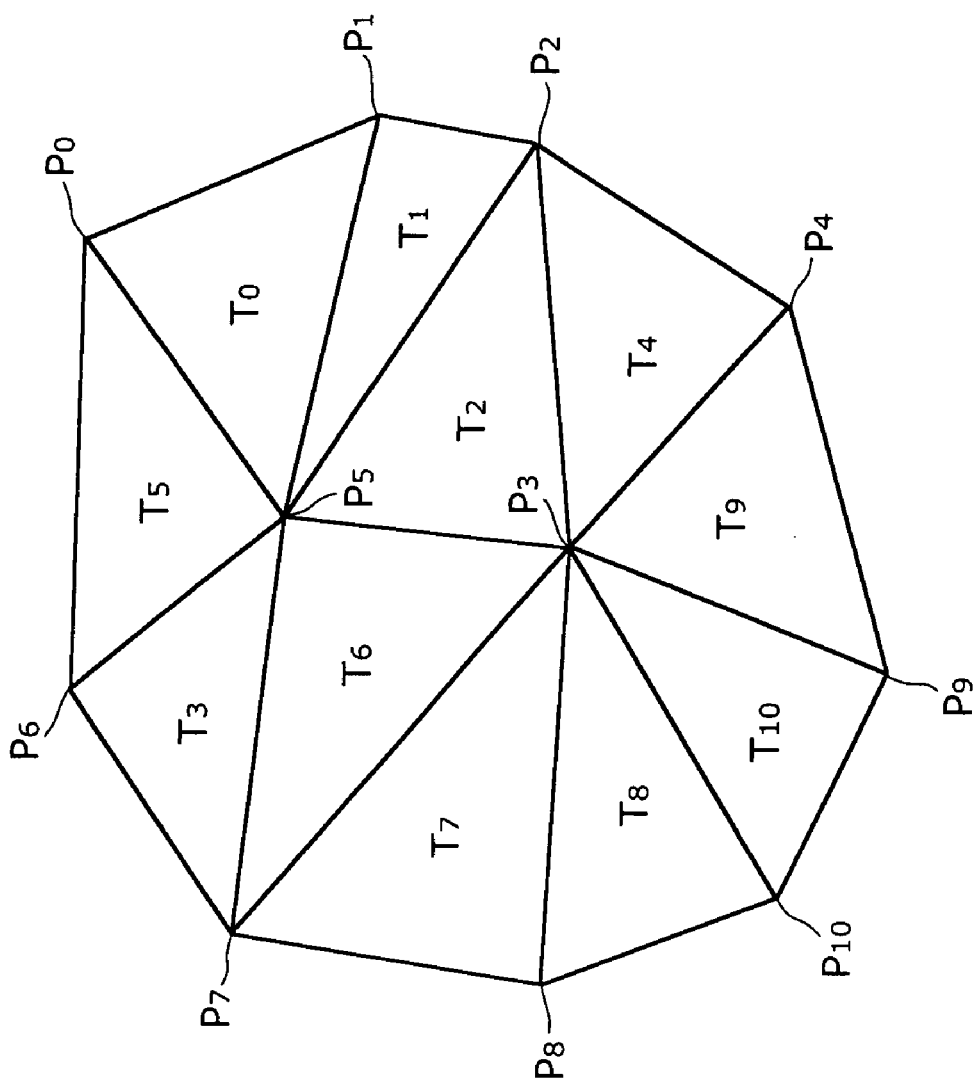
FIG. 4A is a diagram visually showing a data format of a triangle mesh.
FIG. 4B is a diagram showing a data format of a triangle mesh.
Figure 5:
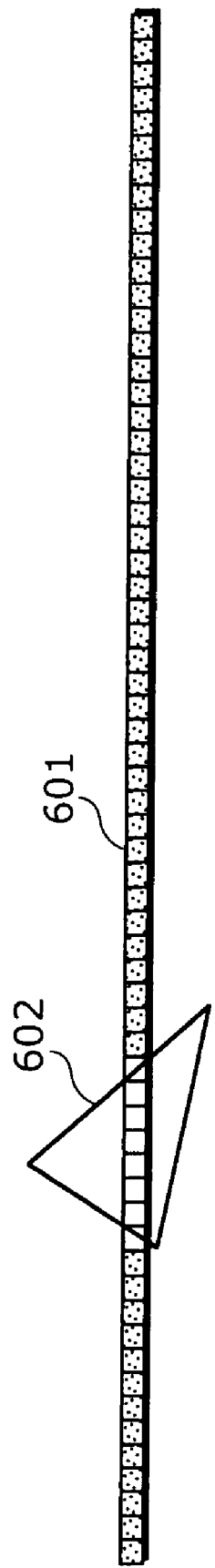
FIG. 5 is a diagram for explaining a case where a pixel block is horizontally long.
Figure 6:
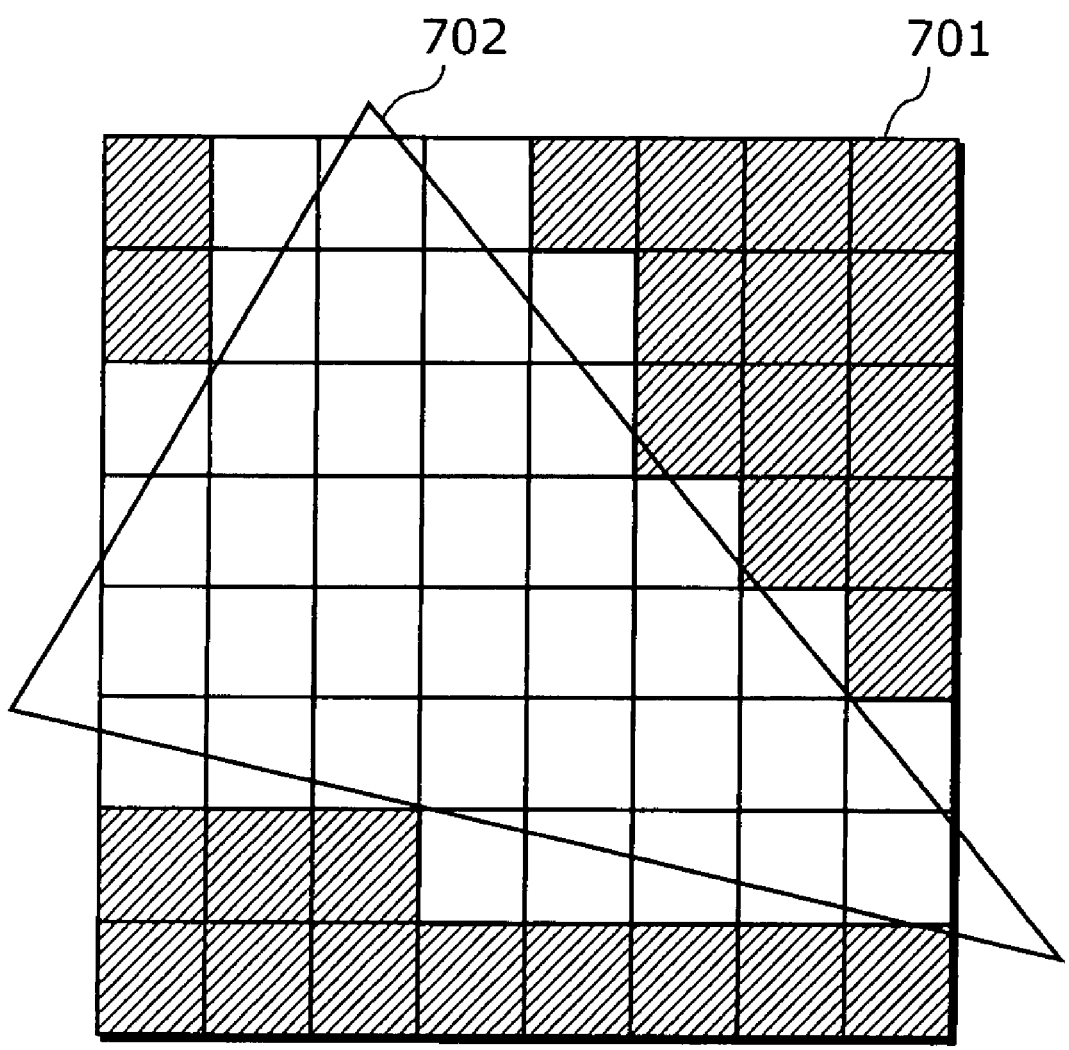
FIG. 6 is a diagram for explaining a case where a pixel block is square in shape.
Figure 7:
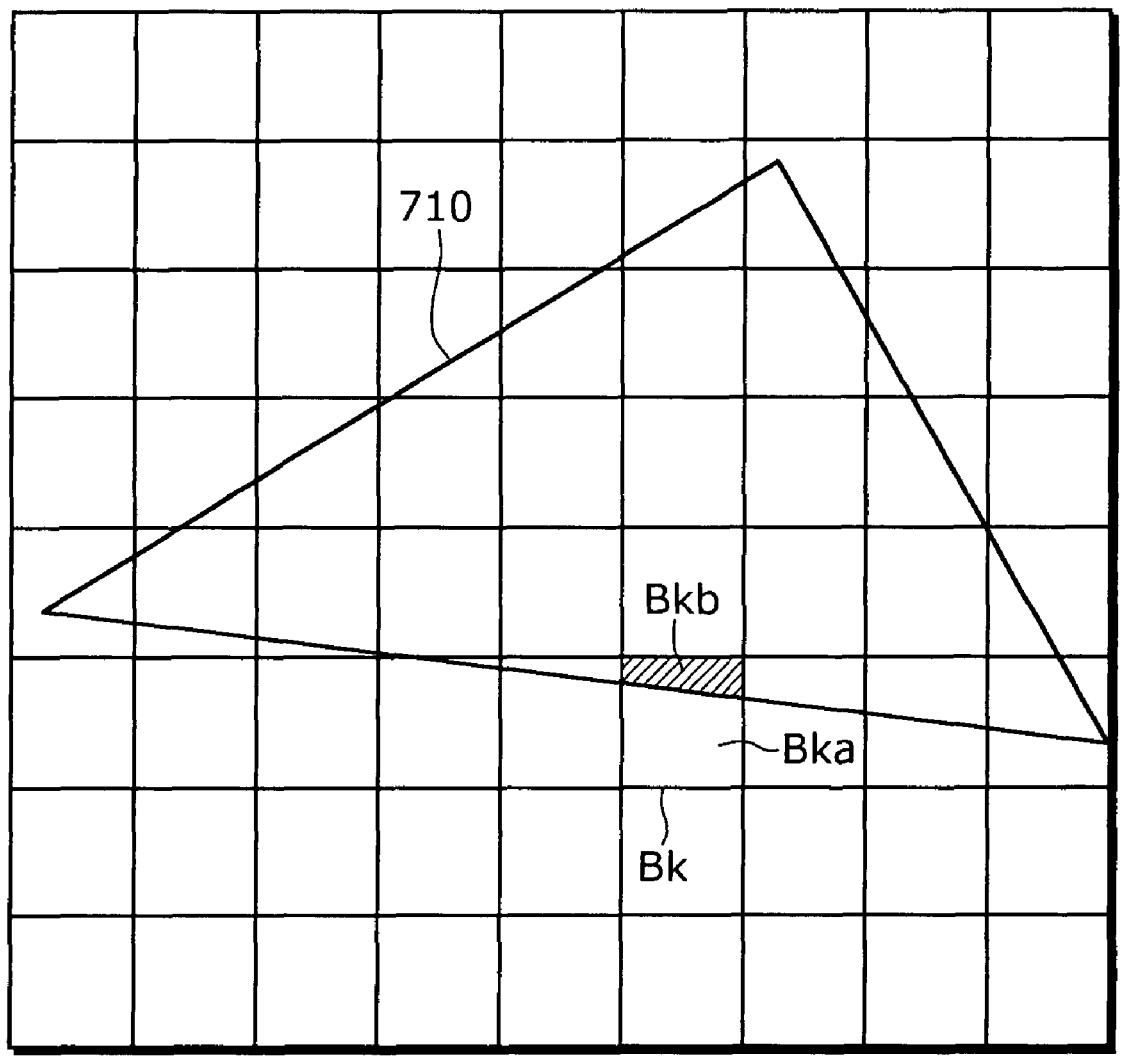
FIG. 7 is a diagram for explaining about unnecessary data.
Figure 8:
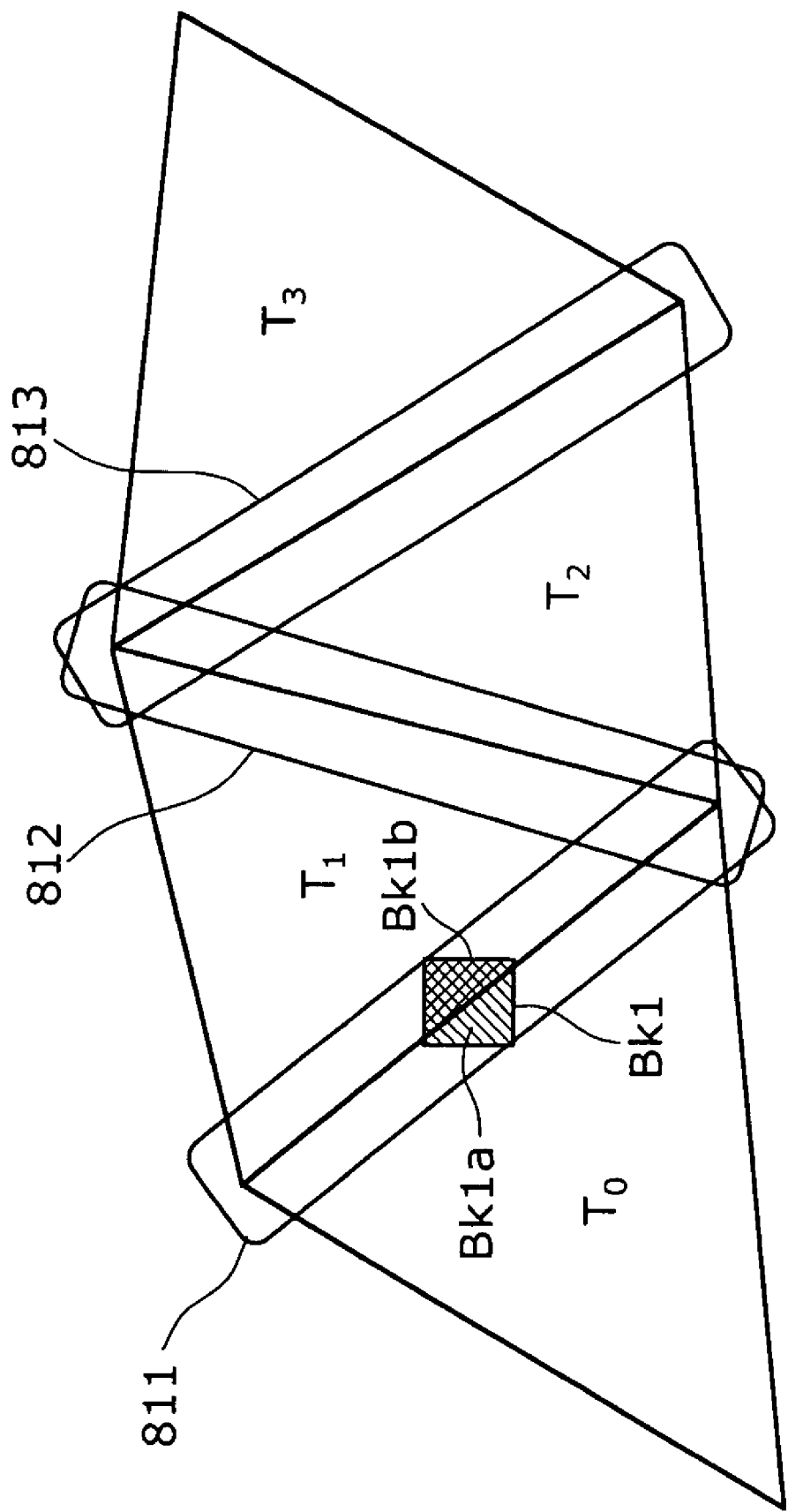
FIG. 8 is a diagram for explaining how the unnecessary data is written into a memory in the case of the triangle strip format.

As shown in FIG. 5 described in Background Art above, the area (pixel block) 601 which is one pixel high by 64 pixels wide has only about 8 effective pixels shared with the triangle 602 (i.e. pixels coinciding with the triangle 602). However, as shown in FIG. 6, the area (pixel block) 701 which is 8 pixels high by 8 pixels wide has as many as 38 effective pixels coinciding with the triangle 702 that is the same as the triangle 602 shown in FIG. 5. It is obvious that the number of effective pixels is increased.

For this reason, a pixel layout on the memory 120 is preferably arranged in the form of an 8-pixel-high by 8-pixel-wide area (pixel block).

With this being the situation, in the present embodiment, the rasterization processing is not performed simply in the direction from the left to the right in each row from the top to the bottom of the screen, but is performed in a unit of an 8-pixel-high by 8-pixel-wide area (pixel block). This allows for an increase in the efficiency. It should be noted here that the order in which the pixels in the block are processed is arbitrary.

As to an area (pixel block) inside the triangle that does not include any part of the edge of the triangle, there is no particular problem since all the pixels in the pixel block is going to be processed. The pixel data read in units of 256 bytes is all effectively used and the resultant written data of 256 bytes is also valid.

On the other hand, consider an area (pixel block) around the perimeter of the triangle that includes the edge of the triangle, that is, a part of the area that is within the triangle is subjected to the drawing processing while the remaining part of the area that is outside the triangle is not subjected to the drawing processing according to the conventional method. As to such a block, the data read in units of 256 bytes includes unnecessary data relating to the pixels outside the triangle. This data is still unnecessary when being written in and, therefore, the ratio of the effective data is decreased.

In the case where the drawing device 100 is equipped as a unit in a system LSI and performs cooperative processing with other cores, a quantitative regulation or the like is often carried out so as to prevent a specific unit from dominating the memory bus and interfering with operations performed by the other units. For example, needless access is also added up the total amount of access and, when the amount goes beyond a limit, there may be a penalty, such as prevention of access for a certain period of time. In view of this, the above-mentioned decrease in the ratio of the effective data is a serious problem.

In order to solve this problem, the drawing device 100 of the present invention uses the information of the four vertices (the vertex $P_N$, the vertex $P_{N+1}$, the vertex $P_{N+2}$, and the vertex $P_{N+3}$) to perform the processing simultaneously or sequentially: on the pixels of the triangle subjected to be drawn (i.e. the triangle $T_N$) that are within the area (pixel block); and on the pixels of the triangle subjected to the first processing (i.e. the triangle $T_{N+1}$) that are within the pixel block. It should be noted that such a pixel block corresponds to the above-mentioned B-pixel block BB. The processing on the B-pixel block BB may be performed when the triangle $T_{N+1}$ subjected to the first processing is processed. In this case, while the triangle $T_N$ subjected to be drawn is being processed, the pixel processing is not performed on the stated B-pixel block BB. The following explanation is premised on the former case, that is, the pixels of the triangle $T_{N+1}$ subjected to the first processing that are within the pixel block including the pixels of the triangle $T_N$ subjected to be drawn are processed simultaneously or sequentially with the processing performed on the triangle $T_N$.

Each parameter of these two triangles can be calculated from the information of the four vertices including the three vertices of the triangle subjected to be drawn and the one vertex of the triangle to be next drawn (i.e. the triangle subjected to the first processing). To be more specific, as described above, the triangle detecting unit 112 detects a pixel block which is entirely or partially included inside the triangle subjected to be drawn, as a triangle pixel block. Moreover, the A-edge detecting unit 113 detects whether at least a part of a common edge (i.e. the edge connecting the vertex $P_N$ and the vertex $P_{N+1}$) shared by the triangle subjected to be drawn (i.e. the triangle $T_N$) and the triangle having been processed most recently (i.e. the triangle $T_{N-1}$) is within the triangle pixel block. The B-edge detecting unit 114 detects whether at least a part of a common edge (i.e. the edge connecting the vertex $P_{N+1}$ and the vertex $P_{N+2}$) shared by the triangle subjected to be drawn (i.e. the triangle $T_N$) and the triangle to be next drawn (i.e. the triangle $T_{N+1}$ subjected to the first processing) is within the triangle pixel block. Then, the C-edge detecting unit 115 detects whether at least a part of a common edge (i.e. the edge connecting the vertex $P_{N+2}$ and the vertex $P_{N+3}$) shared by the triangle to be next drawn (i.e. the triangle $T_{N+1}$ subjected to the first processing) and the triangle to be drawn after the triangle to be next drawn (i.e. the triangle $T_{N+2}$ subjected to the second processing) is within the triangle pixel block having the pixel of the triangle $T_{N+1}$ subjected to the first processing.

Accordingly, the drawing processing is performed on the triangle pixel blocks detected by the triangle detecting unit 112 excluding the pixel block detected by the A-edge detecting unit 113 (i.e. the above mentioned. A-pixel block BA). This is because the A-pixel block BA was processed when the triangle processed most recently (i.e. the triangle $T_{N-1}$) was drawn and, therefore the same drawing processing is prevented from being performed twice.

Of the stated pixel blocks subjected to the drawing processing, the pixel block detected by the B-edge detecting unit 114 (i.e. the stated B-pixel block BB) is located on the common edge shared by the triangle subjected to be drawn (i.e. the triangle $T_N$) and the triangle to be next drawn (i.e. the triangle $T_{N+1}$ subjected to the first processing). Thus, for the triangle to be next drawn (i.e. the triangle $T_{N+1}$ subjected to the first processing), only the B-pixel block BB is drawn in advance as is the case with the triangle to be drawn (i.e. the triangle $T_N$). In many cases, the B-pixel block BB includes only two triangles and, therefore, the processing on the entire B-pixel block BB is completed only by drawing these two triangles. This can reduce the needless memory access.

Among the pixel blocks subjected to the drawing processing, a pixel block which is not detected by the three edge detecting units is inside the triangle subjected to be drawn. Such a pixel block is drawn according to the conventional method.

Figure 11:
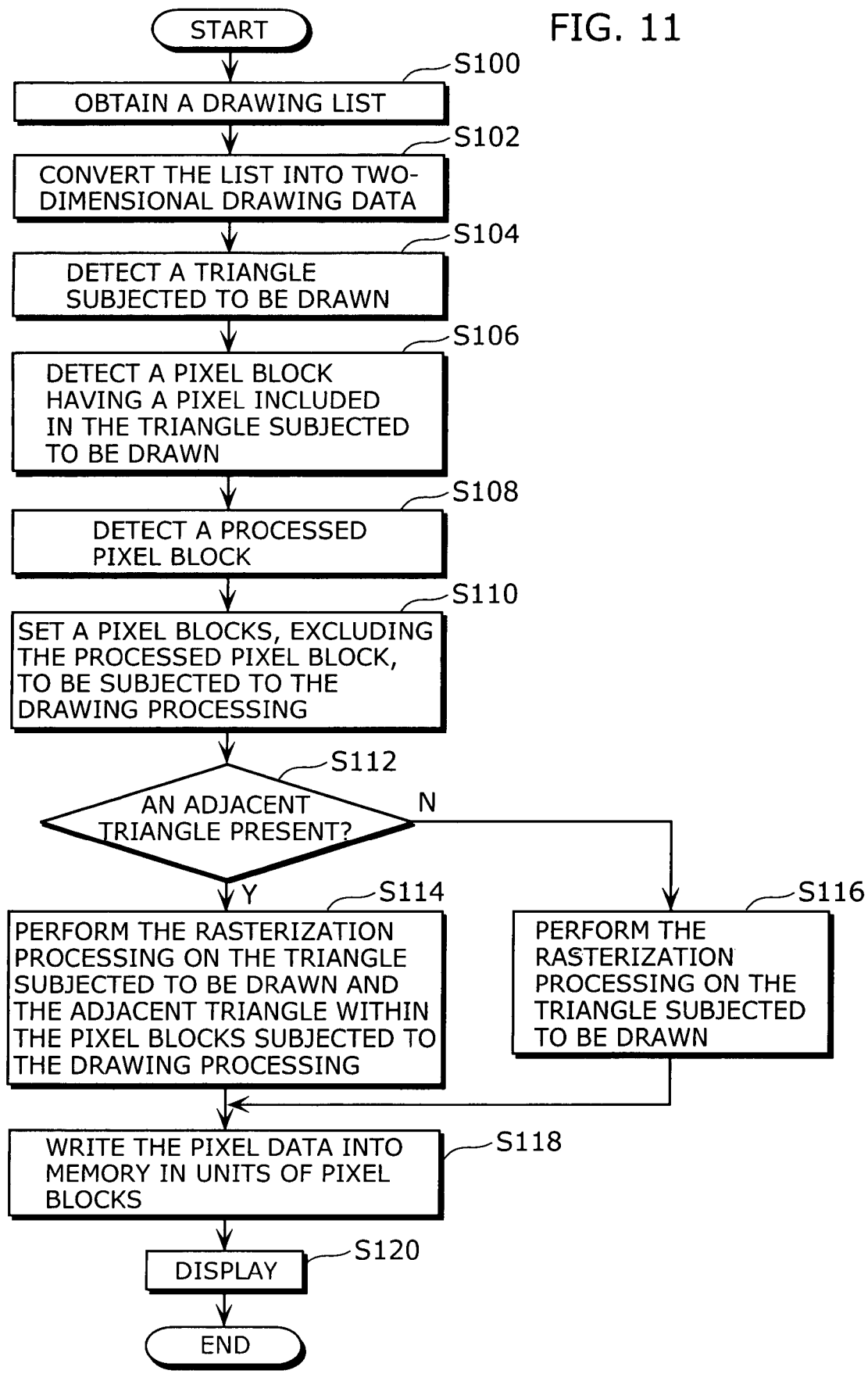
FIG. 11 is a flowchart showing an operation performed by the drawing device according to the embodiment of the present invention.

FIG. 11 is a flowchart showing an operation performed by the drawing device 100 according to the present embodiment.

The control unit 111 of the drawing device 100 first obtains a drawing list (step S100), and then converts the drawing list into two-dimensional drawing data (step S102). From the two-dimensional drawing data, the triangle detecting unit 112 detects a triangle subjected to be drawn, such as the triangle $T_N$ shown in FIG. 10 (step S104).

Moreover, the triangle detecting unit 112 detects a pixel block having a pixel included in the triangle $T_N$ subjected to be drawn as the stated triangle pixel block located inside the block group GB of FIG. 10 (step S106).

From the triangle pixel blocks, the A-edge detecting unit 113 detects a pixel block including a pixel of the processed triangle $T_{N-1}$ that is connected to the triangle $T_N$ subjected to be drawn, as the A-pixel block BA (step S108).

As a consequence, the rasterizing unit 116 excludes the A-pixel block BA, out of the triangle pixel blocks belonging to the triangle $T_N$ subjected to be drawn, from the processing, and sets the remaining pixel blocks to be subjected to the drawing processing (step S110).

The B-edge detecting unit 114 judges whether there is the triangle $T_{N+1}$ subjected to the first processing that is connected to the triangle $T_N$ subjected to be drawn, that is, whether there is a triangle pixel block that includes a pixel of the triangle $T_{N+1}$ subjected to the first processing (step S112).

Here, when the triangle $T_{N+1}$ subjected to the first processing is judged to be present (Y in step S112), the rasterizing unit 116 performs the rasterization processing on at least a part of each of the triangle $T_N$ subjected to be drawn and the triangle $T_{N+1}$ subjected to the first processing, within the pixel blocks subjected to the drawing processing that were set in step S110 (step S114). To be more specific, unlike in the case of the conventional method, the rasterizing unit 116 performs the rasterization processing on the B-pixel block BB, with the pixels of the triangle $T_N$ subjected to be drawn and the pixels of the triangle $T_{N+1}$ subjected to the first processing being included in the B-pixel block BB.

On the other hand, when the triangle $T_{N+1}$ subjected to the first processing is judged not to be present (N in step S112), the rasterizing unit 116 performs the rasterization processing on at least a part of the triangle $T_N$ subjected to be drawn, within the pixel blocks subjected to the drawing processing that were set in step S110 (step S116).

Then, the memory R/W unit 117 writes the pixel data generated through the rasterization processing performed in step S114 or step S116 into the memory unit 120 in units of pixel blocks (step S118). The drawing engine 130 has the display unit 200 display an image in accordance with the pixel data written into the memory 120 (step S120).

It should be noted here that exceptional processes have been omitted in the description so far for the sake of simplification. However, these exceptional processes need to be considered when the drawing device is actually implemented. For example, since no triangle is present preceding the first triangle (N=0) subjected to be drawn, there is no common edge shared by the first triangle and the triangle preceding the first one. Similarly, since no triangle is present after the final triangle (N=NUM−1), there is no common edge shared by the final triangle and the triangle after the final one.

In general, a pixel block including a vertex (such as a pixel block BX and a pixel block BY shown in FIG. 10) has pixels of three or more triangles. For this reason, in many cases, the entire area of that pixel block cannot be filled in using only two triangles. In that case, processing explained as follows may be performed. Note, however, that owing to the relatively easy detection of the pixel block including the vertex, implementation will be easier and performance may be slightly improved if holding two pixel blocks or so and dealing these pixel blocks like caching data when the drawing processing is sequentially performed.

In the case where triangles are small or their angles are acute, one pixel block may include pixels of three or more triangles. Such a pixel block including the pixels of three or more triangles corresponds to an area (or, a pixel block) that is detected simultaneously by the A-edge detecting unit 113 and the B-edge detecting unit 114, or simultaneously by the B-edge detecting unit 114 and the C-edge detecting unit 115. Although not so often, this could happen even outside the pixel block including vertices, and thus attention should be paid here.

In such a case, the triangle $T_N$ subjected to be drawn and the previously-drawn triangle $T_{N-1}$ included in that pixel block have been already drawn. On the other hand, since the triangle $T_{N+1}$ to be next drawn is considered to have already been drawn when the next triangle $T_{N+2}$ is drawn, the triangle $T_{N+1}$ has to be drawn this time. For example, when triangle $T_N$ subjected to be drawn is drawn, the pixel block BY shown in FIG. 10 is drawn, with a part of the triangle $T_{N+2}$ being included. In this case, the drawing device 100 writes the pixel block BY into the memory 120 on a temporary basis, leaving the processing for the entire pixel block BY unfinished. Then, the drawing device 100 reads out the pixel block BY to go on the processing where it had left off. To be more specific, the pixel block BY including a part of the triangle $T_N$ and a part of the triangle $T_{N+1}$ is written into the memory 120, and then is read out again in order for a part of triangle $T_{N+2}$ to be included in the pixel block BY. This is not different from the conventional method in the efficiency. The situation can be improved by introduction of a cache system dedicated to such a case like this. Yet, improvement effect cannot be expected when the system is used less frequently and, in addition, an increased number of man-hours is required. Thus, a comprehensive judgment needs to be made, situation by situation.

In the present embodiment, the triangle detecting unit 112, the A-edge detecting unit 113, the B-edge detecting unit 114, and the C-edge detecting unit 115 are provided outside the rasterizing unit 116. However, they may be implemented inside the rasterizing unit 116. Moreover, the triangle detecting unit 112, the A-edge detecting unit 113, the B-edge detecting unit 114, and the C-edge detecting unit 115 are separately provided in the present embodiment. However, a single module may detect the pixel blocks according to a time-sharing system.

(First Modification)

In the above embodiment, the drawing processing for an area that includes a part of the common edge shared by the triangle $T_N$ subjected to be drawn and the triangle $T_{N+1}$ to be next drawn (that is, the area is a B-pixel block BB) is performed while the triangle $T_N$ subjected to be drawn is being drawn.

A drawing device according to the first modification does not perform the drawing processing for the B-pixel block BB while the triangle $T_N$ subjected to be drawn is being drawn. The drawing device performs the drawing processing for the B-pixel block BB while the triangle $T_{N+1}$ to be next drawn is being drawn. More specifically, within the area of the B-pixel block BB, the pixels of the two triangles are simultaneously or sequentially drawn.

In this case, when drawing the triangle $T_N$ subjected to be drawn, the drawing device according to the first modification also judges whether the triangle pixel block detected by the triangle detecting unit 112 includes the pixel of the triangle $T_{N-1}$ which was subjected to be drawn before the triangle $T_N$. That is to say, when drawing the triangle $T_N$ subjected to be drawn, the drawing device detects the A-pixel block BA which includes the pixel of the triangle $T_{N-1}$ and then performs the rasterization processing on the A-pixel block BA which includes the pixel of the triangle $T_N$ and the pixel of the triangle $T_{N-1}$.

(Second Modification)

In the above embodiment, the drawing device 100 draws the triangles by performing the rasterization processing on the drawing data in the triangle strip format.

A drawing device according to the present modification draws triangles by performing the rasterization processing on drawing data in the triangle fan format. This data format also allows for the same effect as in the above embodiment.

(Third Modification)

In the above embodiment, the drawing device 100 draws the triangles by performing the rasterization processing on the drawing data in the triangle strip format.

A drawing device according to the present modification draws triangles by performing the rasterization processing on drawing data in the format whereby the triangle strip format and the triangle fan format are switchable in progress (this format is the so-called Triangle Snake). This data format also allows for the same effect as in the above embodiment.

(Fourth Modification)

In the above embodiment and the first modification, the area which includes a part of the common edge shared by the two triangles (that is, the area is a B-pixel block BB) is drawn while the triangle that comes first in the drawing order is being drawn, or while the triangle that comes later in the drawing order is being drawn. That is, in the above embodiment and the first modification, the timing at which the stated pixel block is to be drawn is uniquely decided on the basis of the order in which the triangles are drawn.

A drawing device according to the present modification decides the timing at which the stated pixel block is to be drawn on a case-by-case basis, in accordance with information and random numbers additionally given.

Also, it should be obvious to conceive a construction whereby the stated pixel block that includes a part of the common edge is not drawn while either of the triangles is being drawn and only this pixel block is drawn separately.

(Fifth Modification)

In the above embodiment, the drawing device 100 draws the triangles by performing the rasterization processing on the drawing data in the triangle strip format.

A drawing device according to the present modification draws triangles by performing the rasterization processing on drawing data in the triangle mesh format. In the case of the triangle mesh format, a triangle may share its edges with other three triangles at the maximum, and these triangles are not necessarily drawn sequentially. For this reason, unlike in the cases of the above embodiment and the first modification, the timing, at which the pixel block located on the common edge is drawn while which one of the triangles is being drawn, cannot be decided only by the drawing order.

In view of this, the drawing device according to the present modification obtains information, for each edge, that shows whether a pixel block located on the common edge shared by two triangles should be drawn while which one of the triangles is being drawn. In accordance with the obtained information, the drawing device decides on the timing at which the pixel block located on the common edge is drawn while either of the triangles is being drawn. It should be understood that this can be automatically determined from a calculation using a number that is given for each triangle.

(Sixth Modification)

In the above embodiment and the first to fifth modifications, only four vertices are treated so only one common edge can be processed at a time. Roughly speaking, although two of three edges can be processed as shared edges, the remaining one edge cannot be processed in such a manner.

In order to solve this problem, a drawing device according to the present modification processes all the three shared edges using information of six vertices at the maximum. To be more specific, the drawing device performs the processing which has been performed in the above embodiment and the first to fifth modifications for each of the three edges.

Figure 12:
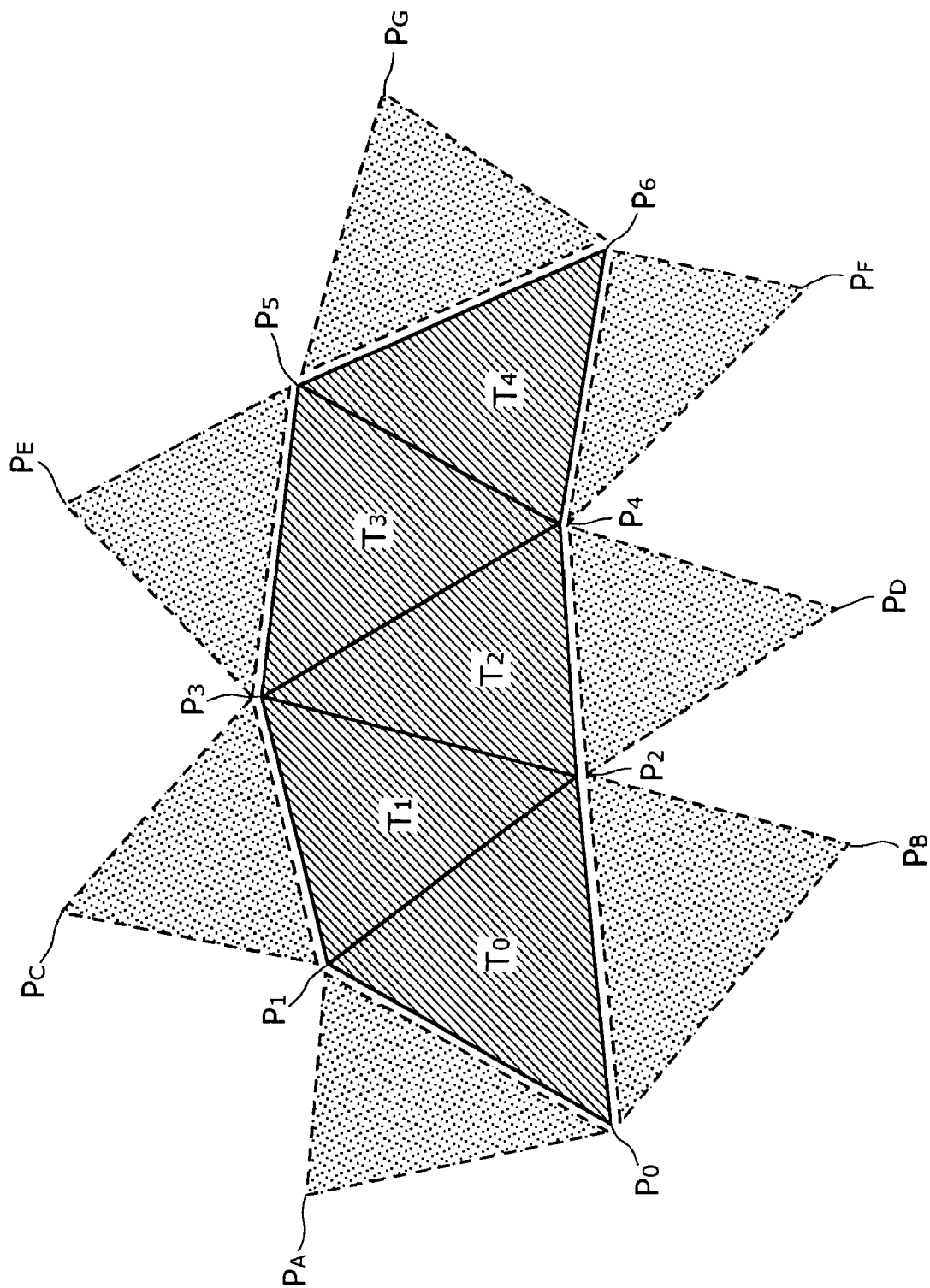
FIG. 12 is a diagram for explaining about processing performed by a drawing device according to a sixth modification of the embodiment of the present invention.

FIG. 12 is a diagram for explaining about the processing performed by the drawing device according to the present modification.

Consider a triangle strip (a vertex $P_0$, a vertex $P_1$, a vertex $P_2$, a vertex $P_3$, a vertex $P_4$, a vertex $P_5$, and a vertex $P_6$) shown in FIG. 12. The edges shared among triangles (a triangle $T_0$, a triangle $T_1$, a triangle $T_2$, a triangle $T_3$, and a triangle $T_4$) making up the triangle strip can prevent needless use of the bus band. Yet, the other edges are the same as in the conventional case in their current states.

With this being the situation, in order to process the remaining edges such as the one connecting the vertex $P_0$ and the vertex $P_1$, the drawing device according to the present modification uses information of vertices (a vertex $P_A$, a vertex $P_B$, a vertex $P_C$, a vertex $P_D$, a vertex $P_E$, a vertex $P_F$, and a vertex $P_G$) of triangles sharing these remaining edges so as to perform the processing as in the case of the fifth modification.

In the case of the triangle strip format, graphics data for the vertices of a certain triangle making up the triangle strip may include a vertex of another triangle which shares an edge with that certain triangle. For example, data of the vertices $P_0$, $P_1$, and $P_2$ of the triangle $T_0$ include data of the vertex $P_A$. This allows the drawing device to specify the vertex $P_A$, and also allows the data format to be simple.

Here, drawing information may be separately given to show that a pixel block located on the common edge shared by the two triangles is drawn while which one of the triangles is being drawn. Moreover, when a triangle other than the triangle subjected to be drawn is not drawn, it may be possible to use the fact that information of a vertex of another triangle sharing an edge with the triangle subjected to be drawn is not necessary. More specifically, only in the case where a pixel block located on a shared edge is processed while the triangle subjected to be drawn is being processed, the vertex data of the other triangle is included in the graphics data. Otherwise, data of a dummy vertex is included in the graphics data. This allows the drawing device to specify the vertex of the other triangle or the dummy vertex, and also allows the data format to be simple.

Note that there are two kinds of dummy vertices between which a distinction should be made: "a vertex (referred to as "OTHER") showing that the pixel block located on the common edge shared by the triangle subjected to be drawn and another triangle is processed while the other triangle is being drawn"; and "a vertex (referred to as "NONE") showing that the current edge is not shared". To be more specific, the vertex (NONE) is nonshare information showing that there is no triangle sharing an edge with the triangle subjected to be drawn whereas the vertex (OTHER) is exclusion information showing that the pixel block judged to include a pixel of the other triangle is excluded from the rasterization processing and that the rasterization processing should be performed on this pixel block when the other triangle is being processed. Accordingly, when the dummy vertex shows the vertex (OTHER), the drawing device disables the rasterization processing from being performed on the pixel block including the pixel of the other triangle, i.e. the pixel block including the shared edge and, thus, does not draw this area (the pixel block). On the other hand, when the dummy vertex shows the vertex (NONE), the drawing device judges that the pixel block located on the edge of the triangle subjected to be drawn corresponding to the vertex (NONE) does not include a pixel of another triangle and, thus, draws the pixel block including only the pixel of the triangle subjected to be drawn.

Figure 13:
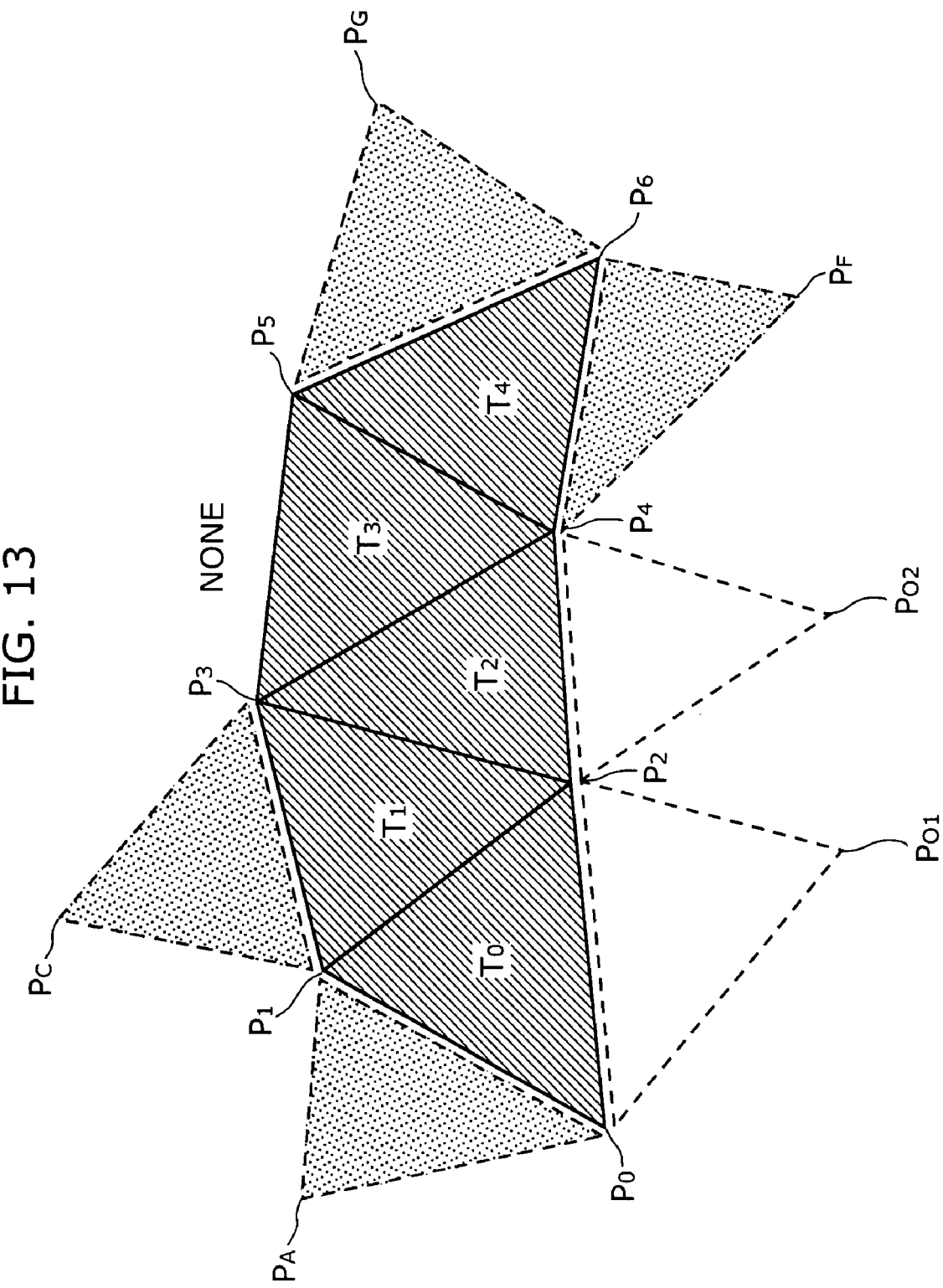
FIG. 13 is a diagram for explaining about dummy vertices according to the sixth modification of the embodiment of the present invention.

FIG. 13 is a diagram for explaining about dummy vertices.

In the case where an OTHER vertex $P_{O1}$ is present for the triangle $T_0$ subjected to be drawn, the drawing device does not perform the drawing processing on the pixel block located on the edge connecting the vertex $P_0$ and the vertex $P_2$ when drawing the triangle $T_0$, but performs the drawing processing on this pixel block when drawing the triangle having the OTHER vertex $P_{O1}$ with a part of the triangle $T_0$ previously subjected to be drawn being included in this pixel block.

In the case where a NONE vertex is present for the triangle $T_3$ to be drawn, the drawing device performs the drawing processing on the pixel block located on the edge connecting the vertex $P_3$ and the vertex $P_5$ when drawing the triangle $T_3$ subjected to be drawn.

Here, note that data of vertices including the vertex $P_0$, the vertex $P_A$, the vertex $P_1$, the OTHER vertex $P_{O1}$, the vertex $P_2$, the vertex $P_C$, the vertex $P_3$, the OTHER vertex $P_{O2}$, the vertex $P_4$, the NONE vertex, the vertex $P_5$, the vertex $P_F$, the vertex $P_6$, and the vertex $P_G$ is variable length data. The data lengths vary among usual vertices (the vertex $P_0$, the vertex $P_1$, the vertex $P_2$, the vertex $P_3$, the vertex $P_4$, the vertex $P_5$, and the vertex $P_6$), the shared vertices (the vertex $P_A$, the vertex $P_C$, the vertex $P_F$, and the vertex $P_G$), and the dummy vertices (the OTHER vertex $P_{O1}$, the OTHER vertex $P_{O2}$, and the NONE vertex). Owing to this variation, the size of a dummy vertex can be minimized. A dummy vertex does not necessarily need to have the same size as a usual vertex.

It should be noted that although the explanation has been given in the present modification for the case of the triangle strip format as the drawing data format, the data format may be the triangle fan format, the snake format, or the triangle mesh format.

So far, the present invention has been described according to the embodiment and the modifications. However, the present invention is not limited to these.

For example, although the explanation has been given in the embodiment and the modifications using triangles only, a polygon having four or more edges may be used.

Moreover, each drawing device according to the embodiment and the modifications may be constructed as a dedicated semiconductor integrated circuit (LSI) or a part of it. Alternatively, the drawing device may be constructed using a different unit, such as a transistor and a relay component.

The drawing device according to the present invention can make effective use of a memory bus bandwidth without needing an expensive and complicated circuit configuration, and is useful not only in the three-dimensional computer graphics processing but in the two-dimensional processing as well. Therefore, there is a possibility for the device to be used in the fields of home appliances, game machines, and personal computers that include such functions.

The invention claimed is:

1. A drawing device which performs rasterization processing on drawing data and performs a drawing operation, said drawing device comprising:
   a triangle specifying unit operable to specify a first triangle area, from the drawing data, that is subjected to the rasterization processing and to specify a second triangle area, from the drawing data, that is subjected to the rasterization processing;
   a block specifying unit operable to specify a pixel block having a pixel included in the first triangle area;
   a judging unit operable to judge whether or not the specified pixel block includes both the pixel included in the first triangle area and a pixel included in a second triangle area connected to the first triangle area;
   a rasterizing unit operable to, when said judging unit judges that the specified pixel block includes both the pixel included in the first triangle area and the pixel included in the second triangle area, simultaneously rasterize each pixel, included in the first triangle area and the second triangle area, that is included in the specified pixel block, so as to generate pixel data;
   a writing unit operable to write the generated pixel data of the specified pixel block into a memory; and
   a display control unit operable to control a display of an image in accordance with the generated pixel data written into the memory, wherein, when said triangle specifying unit specifies the second triangle area, said block specifying unit is operable to specify pixel blocks having pixels included in the second triangle area, and wherein, when said triangle specifying unit specifies the second triangle area, said rasterizing unit is operable to (i) exclude a pixel block, of the specified pixel blocks having pixels included in the second triangle area, from the rasterization processing of the second triangle area, the excluded pixel block being judged by said judging unit to include pixels included in the first triangle area and the second triangle area, and (ii) rasterize pixels included in other pixel blocks, which are pixels blocks, other than the excluded pixel block, from among the specified pixels blocks having the pixels included in the second triangle area.

2. The drawing device according to claim 1, wherein the second triangle area is an area that is to be drawn after the first triangle area is drawn.

3. The drawing device according to claim 1, wherein the second triangle area is an area that is to be drawn before the first triangle area is drawn.

4. The drawing device according to claim 1,
wherein said triangle specifying unit is further operable to specify the second triangle area, from the drawing data, that is subjected to the rasterization processing, wherein, when said triangle specifying unit specifies the second triangle area, said block specifying unit specifies the pixel blocks having pixels included in the second triangle area, and wherein said rasterizing unit is further operable to, when said triangle specifying unit specifies the second triangle area, exclude a pixel block, of the specified pixel blocks, judged by said judging unit to include pixels included in the first triangle area and the second triangle area, the excluded pixel block being excluded from the rasterization processing of the first triangle area.

5. The drawing device according to claim 1, wherein, when a vertex of the second triangle area other than two vertices at ends of an edge shared by the first triangle area and the second triangle area is specified from the drawing data, said judging unit is operable to judge that the specified pixel block, which is located on the shared edge, includes the pixel included in the second triangle area.

6. The drawing device according to claim 1, wherein, when specifying unshare information, which shows that there is no triangle area sharing an edge with the first triangle area, from the drawing data, said judging unit is operable to judge that the specified pixel block, which is located on the edge of the first triangle area according to the unshare information, does not include the pixel included in the second triangle area.

7. The drawing device according to claim 1, wherein, when specifying exclusion information from the drawing data, said rasterizing unit is operable to, during the rasterization processing of the first triangle area, disable the rasterization processing from being performed on the specified pixel block, the exclusion information indicating: that the specified pixel block, judged by said judging unit to include both the pixel of the first triangle area and the pixel of the second triangle area, is to be excluded from the rasterization processing of the first triangle area; and that the rasterization processing is to be performed on the specified pixel block when the second triangle area is subjected to the rasterization processing.

8. The drawing device according to claim 1, wherein the drawing data is structured in a triangle strip format.

9. The drawing device according to claim 1, wherein the drawing data is structured in a triangle fan format.

10. The drawing device according to claim 1, wherein the drawing data is structured in both a triangle strip format and a triangle fan format.

11. The drawing device according to claim 1, wherein the drawing data is structured in a triangle mesh format.

12. An integrated circuit which performs rasterization processing on drawing data for a drawing operation, said integrated circuit comprising:

a triangle specifying unit operable to specify a first triangle area, from the drawing data, that is subjected to the rasterization processing and to specify a second triangle area, from the drawing data, that is subjected to the rasterization processing;

a block specifying unit operable to specify a pixel block having a pixel included in the first triangle area;

a judging unit operable to judge whether or not the specified pixel block includes both the pixel included in the first triangle area and a pixel included in a second triangle area connected to the first triangle area;

a rasterizing unit operable to, when said judging unit judges that the specified pixel block includes both the pixel included in the first triangle area and the pixel included in the second triangle area, simultaneously rasterize each pixel, included in the first triangle area and the second triangle area, that is included in the specified pixel block, so as to generate pixel data;

a writing unit operable to write the generated pixel data of the specified pixel block into a memory; and a display control unit operable to control a display of an image in accordance with the generated pixel data written into the memory, wherein, when said triangle specifying unit specifies the second triangle area, said block specifying unit is operable to specify pixel blocks having pixels included in the second triangle area, and wherein, when said triangle specifying unit specifies the second triangle area, said rasterizing unit is operable to (i) exclude a pixel block, of the specified pixel blocks having pixels included in the second triangle area, from the rasterization processing of the second triangle area, the excluded pixel block being judged by said judging unit to include pixels included in the first triangle area and the second triangle area, and (ii) rasterize pixels included in other pixel blocks, which are pixels blocks, other than the excluded pixel block, from among the specified pixels blocks having the pixels included in the second triangle area.

13. A drawing method of using a drawing device to perform rasterization processing on drawing data for a drawing operation, said drawing method comprising:

specifying, by a triangle specifying unit of the drawing device, (i) a first triangle area, from the drawing data, that is subjected to the rasterization processing, and (ii) a second triangle area, from the drawing data, that is subjected to the rasterization processing;

specifying, by a block specifying unit of the drawing device, a pixel block having a pixel included in the first triangle area;

judging, by a judging device of the drawing device, whether or not the specified pixel block includes both the pixel included in the first triangle area and a pixel included in a second triangle area connected to the first triangle area;

when the specified pixel block is judged in said judging to include both the pixel included in the first triangle area and the pixel included in the second triangle area, simultaneously rasterizing, by a rasterizing unit of the drawing device, each pixel, included in the first triangle area and the second triangle area, that is included in the specified pixel block, so as to generate pixel data;

writing, into a memory of the drawing device, the generated pixel data of the specified pixel block; and controlling, by a display control unit of the drawing device, a display of an image in accordance with the generated pixel data written into the memory, wherein, when the triangle specifying unit specifies the second triangle area in said specifying, the block specifying unit specifies pixel blocks having pixels included in the second triangle area, and wherein, when the triangle specifying unit specifies the second triangle area in said specifying, the rasterizing unit (i) excludes a pixel block, of the specified pixel blocks having pixels included in the second triangle area, from the rasterization processing of the second triangle area, the excluded pixel block being judged by said judging to include pixels included in the first triangle area and the second triangle area, and (ii) rasterizes pixels included in other pixel blocks, which are pixels blocks, other than the excluded pixel block, from among the specified pixels blocks having the pixels included in the second triangle area.

14. A non-transitory computer-readable recording medium having a program recorded thereon, the program for performing rasterization processing on drawing data for a drawing operation, the program causing a computer to execute a method comprising:

specifying a first triangle area, from the drawing data, that is subjected to the rasterization processing, and specifying a second triangle area, from the drawing data, that is subjected to the rasterization processing;

specifying a pixel block having a pixel included in the first triangle area;

judging whether or not the specified pixel block includes both the pixel included in the first triangle area and a pixel included in a second triangle area connected to the first triangle area;

when the specified pixel block is judged in said judging to include both the pixel included in the first triangle area and the pixel included in the second triangle area, simultaneously rasterizing each pixel, included in the first triangle area and the second triangle area, that is included in the specified pixel block, so as to generate pixel data;

writing the generated pixel data of the specified pixel block into a memory; and controlling a display of an image in accordance with the generated pixel data written into the memory, wherein, when said specifying specifies the second triangle area, said specifying of the pixel block specifies pixel blocks having pixels included in the second triangle area, and wherein, when said specifying specifies the second triangle area, said simultaneously rasterizing further includes (i) excluding a pixel block, of the specified pixel blocks having pixels included in the second triangle area, from the rasterization processing of the second triangle area, the excluded pixel block being judged by said judging to include pixels included in the first triangle area and the second triangle area, and (ii) rasterizing pixels included in other pixel blocks, which are pixels blocks, other than the excluded pixel block, from among the specified pixels blocks having the pixels included in the second triangle area.

* * * * *